(12) United States Patent
Zimmer et al.

(10) Patent No.: US 7,685,376 B2
(45) Date of Patent: Mar. 23, 2010

(54) METHOD TO SUPPORT HETEROGENEOUS MEMORIES

(75) Inventors: Vincent J. Zimmer, Federal Way, WA (US); Michael A. Rothman, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 11/418,063

(22) Filed: May 3, 2006

(65) Prior Publication Data

US 2007/0260827 A1 Nov. 8, 2007

(51) Int. Cl.
*G06F 12/00* (2006.01)
(52) U.S. Cl. .................................. 711/154; 711/170
(58) Field of Classification Search .......... 711/170, 711/154
See application file for complete search history.

(56) References Cited

U.S. PATENT DOCUMENTS

| | | | | |
|---|---|---|---|---|
| 5,509,138 | A * | 4/1996 | Cash et al. | 711/170 |
| 5,613,071 | A | 3/1997 | Rankin et al. | |
| 5,675,758 | A * | 10/1997 | Sowadsky et al. | 712/216 |
| 6,530,007 | B2 * | 3/2003 | Olarig et al. | 711/167 |
| 6,662,276 | B2 | 12/2003 | Schoinas | |
| 6,668,310 | B2 * | 12/2003 | McKenney | 711/147 |
| 2004/0163112 | A1 * | 8/2004 | Matula et al. | 725/50 |
| 2005/0033948 | A1 * | 2/2005 | Wei | 713/1 |
| 2005/0144486 | A1 | 6/2005 | Komarla et al. | |
| 2007/0180203 | A1 * | 8/2007 | Ramgarajan et al. | 711/157 |
| 2007/0188391 | A1 * | 8/2007 | Tu et al. | 343/702 |

OTHER PUBLICATIONS

Zimmer, et al. "Programmatic Binding of Power Management Events," U.S. Appl. No. 11/096,842, filed Mar. 30, 2005.
Static Resource Affinity Table, version 1.2 updated Mar. 31, 2003, available at http://www.microsoft.com/whdc/system/cec/sratdwn.nmspx (12 pages).
Advanced Configuration and Power Interface Spec, Revision 3.0, Sep. 2, 2004, at http://www.acpi.info/spec30.htm, Sections 3.7.2; 5.2.15; 5.2.16; 6.2.13; and 16.

* cited by examiner

*Primary Examiner*—Pierre-Michel Bataille
*Assistant Examiner*—John P Fishburn
(74) *Attorney, Agent, or Firm*—David P. McAbee

(57) ABSTRACT

A method and apparatus is described herein for supporting heterogeneous local memories. A resource affinity table includes an entry for each local memory mapped into an address space. Each entry associating the corresponding local memory with a logical distance, such as a domain number. During runtime thread scheduling, memory operations, and other tasks are potentially assigned to the local memory devices based on the logical distance associated with each memory in the resource affinity table. As a consequence, heterogeneous memory types or homogeneous memories with different access times may be efficiently combined in a system to achieve large amount of memory at a smaller cost without sacrificing performance by allowing an operating system to make intelligent scheduling choices based on logical distances/access times of the aforementioned memories.

30 Claims, 4 Drawing Sheets

METHOD TO SUPPORT HETEROGENEOUS MEMORIES

FIELD

This invention relates to the field of client memory and, in particular, to supporting heterogeneous memory types.

BACKGROUND

Computer systems have quickly become the center of numerous operations performed in households throughout the world. Previously, a computer was used only for computing operations; however, uses for computers have progressed from this simple model into an electronics hub. A few examples of this progression include using a computer as a media center, a TV, a stereo, and a picture repository. As a result, the amount of multi-tasking on a computer system has also drastically increased, requiring more system memory to perform multiple operations.

In the recent past, a majority of local memory in a computer system included dynamic random access memory (DRAM), both for its speed and relatively inexpensive nature. Common examples of DRAM include synchronous DRAM (SDRAM), double-data rate ram (DDR), and fully buffered DRAM (FBD). Typically, only one type of DRAM is used per system. In fact, if multiple double inline memory modules (DIMMs) are used in a computer system, not only is the type of DIMM matched but the timing of the DIMM is also often closely matched to ensure the highest performance.

However, as non-volatile memory (NVM), such as flash devices, have developed, the cost has been decreased. Furthermore, as the current investigation into different types of flash, such as NAND flash and multi-cell technology, increases, the cost of newer flash devices starts to approach and potentially become cheaper than DRAM technologies. Yet, NVM still often demonstrates poorer performance than DRAM. Consequently, it may become potentially advantageous to mix memory types in a computer system to achieve a balance between price, speed, power dissipation, and other considerations.

In many server implementations, local memory, i.e. memory in a single server or computing system, is shared with global/remote memory, i.e. memory on other platforms or computing systems. However, to achieve this a Static Resource Affinity Table (SRAT) is usually used to represent the distance of a memory, so software may determine which memory to use based on the distance of the memory and the time-critical nature of the memory operation.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of memory types, fields in tables, software storage, implementation, etc. in order to provide a thorough understanding of the present invention. It will be apparent, however, to one skilled in the art that these specific details need not be employed to practice the present invention. In other instances, well known components or methods, such as specific software policies based on distance of memory, memory implementation, and determining access speeds of memory, as well as code for operating systems, basic input/output software (BIOS), and handler routines, have not been described in detail in order to avoid unnecessarily obscuring the present invention.

The method and apparatus described herein are for supporting heterogeneous memories in a computer system, which is specifically discussed in reference to local system memory in a computer system. However, the methods and apparatus for are not so limited, as they may be implemented on or in association with any system or integrated circuit device, such as a portable digital assistant (PDA), cell phone, or other electronic device.

Controller Hub

Figure 1:
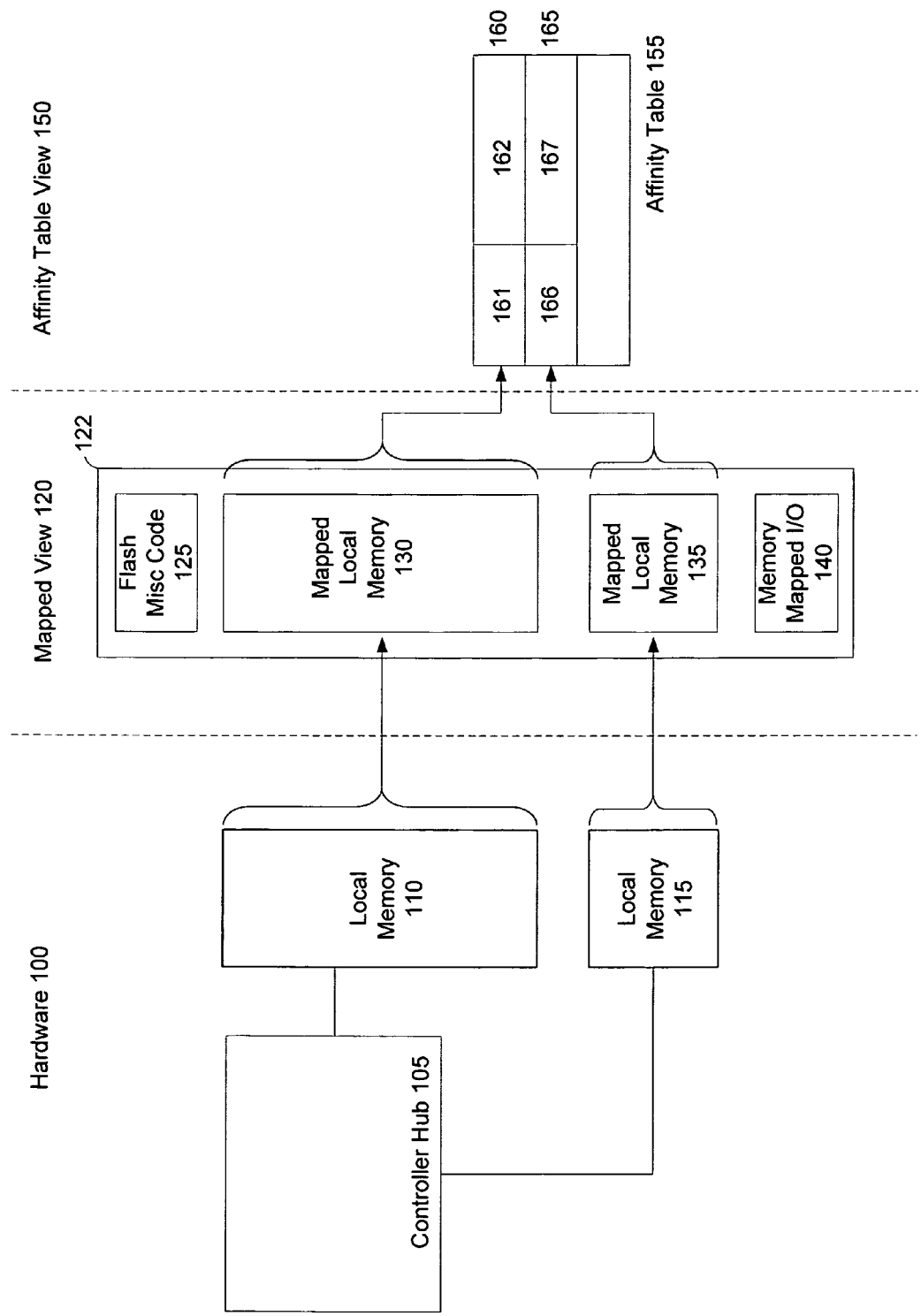
FIG. 1 illustrates an embodiment of an abstract view of local memory mapped into memory space and associated with an entry in an affinity table.

Referring to FIG. 1, an embodiment of hardware 100 in a computer system is illustrated. In this example, controller hub 105 is coupled to local memory 110 and 115. Controller hub 105 may be any integrated circuit or programmable device, such as a Field Programmable Gate Array (FPGA). In one embodiment, controller hub 105 is a hub in a computer system to communicate with local memory, such as local memory 110 and 115, as well as with a processing element, such as a microprocessor or embedded processor. An MCH may also communicate with or include a graphics device, such as a graphics processor or add-in card.

As an example, controller hub 105 is a memory controller hub (MCH) coupled to an interconnect controller hub (ICH), where the ICH is to communicate with input/output devices. In another embodiment, controller hub 105 is an ICH. Commonly, a combination of the MCH and ICH are referred to as a chipset, which is typically implemented on two different integrated circuits.

Local Memory

As illustrated, local memory 110 and 115 are coupled to controller hub 105. Local memory, as used herein, refers to any memory in a computer system, such as a PDA, embedded system, notebook system, computer system, server system, or other computing platform. For example, local memory 110 is a Dynamic Random Access Memory (DRAM) and local memory 115 is a non-volatile memory; both of which are coupled through a motherboard to controller hub 105. Although, local memory 110 and 115 are illustrated coupled to the same controller hub, local memories 110 and 115 are not so limited. In another embodiment, local memory 110 is a system memory and local memory 115 is a cache memory in a processor. As yet another example, local memory 110 includes a DRAM or SRAM on a first processor in a multi-processor computer system and local memory 115 includes a DRAM or SRAM on a second processor in the multiprocessor system. In contrast to a local memory, a remote memory refers to memory in other computing systems, such as a remote or client server external to a computing platform that includes the local memory.

In one embodiment, local memory 110 and 115 are heterogeneous local memory types. Here, a memory type refers to the style of memory, such as a random access memory (RAM), a non-volatile memory (NVM), or a specific type of RAM/NVM. Common examples of local memory types include a Static Random-Access (SRAM), Dynamic Random-Access Memory (DRAM), Synchronous DRAM (SDRAM), Double-Rate DRAM (DDR), Fully-Buffered DRAM (FBD), Non-volatile memory (NVM), NAND Flash, NOR flash, and polymer memory. In another embodiment, local memory 110 and 115 are homogeneous memory types with different access times.

Access time potentially refers to read latency, read bandwidth, write latency, write bandwidth, erase bandwidth, or a combination thereof. For example, assuming memory 110 is a DRAM and memory 115 is a NAND flash device, Table 1 illustrates exemplary values of different potential uses for access time of a DRAM and NAND device manufactured at 90 nm.

TABLE 1

Exemplary DRAM and NAND Access Times

| | Values (at 90 nm) | |
|---|---|---|
| | DRAM | SBC NAND |
| Read Latency | 45-60 ns | 10-25 μs |
| Read BW (×16 MB/s)* | 1600* | 40-80* |
| Write Latency | 45-60 ns | 200 μs |
| Write BW (×16 MB/s)** | 1000-1600 | 25-14 |
| Erase BW (×16 MB/s) | Not Needed | 50-90 |
| Standby Current (uA) | 150 to 3000 | Low 10s |
| Active Current (mA) | 100-200 | 10-30 |

As can be seen the read bandwidth (BW) of the DRAM is 1600 MB/s versus 40-80 MB/s of the a NAND device. In addition, the read latency of the NAND device is 10-25 μs versus 45-60 ns of the DRAM device. Similar results are seen from the illustrative numbers shown in Table 1 for write bandwidth and write latency.

Address Space

In FIG. 1, local memories 110 and 115 are shown mapped into address space 122 in mapped view 120. Often an address space is viewed as a contiguous address space from the perspective of a device. For example, a processor views address space 122 as a contiguous address space, even though the address space includes a plurality of different physical memories at different physical memory locations. In this example, address space 122 includes flash memory 125, local memory 130, local memory 135, and memory mapped I/O 140.

Address space 122 may be assigned/addressable by any number of components in a computing platform. In one embodiment, address space 122 represents an entire address space of a computing platform, which is addressable by all components. In this case, different parts of address space 122 are divided into smaller address spaces associated with other devices. For example, each PCI-Express device is associated with a portion of memory mapped I/O 140 and a portion of local memory 130 and/or 135. In another embodiment, address space 122 is addressable at a kernel-level, such as by operating system code.

The following is an extremely simplified example to illustrate operation of a mapped address space. A processor, when executing guest software, such as operating system (OS) code or an application, issues an instruction to a virtual address, which the processor views as contiguous memory. In this example, assume the virtual address includes a base/page value and an offset value. The physical memory, such as address space 120, is logically viewed in pages. The base/page value is to determine the page, and the offset value is determine the location within the page of memory. Through the use of tables and optional arithmetic a linear address is obtained. In an embodiment, where paging is turned off, the linear address may actually be the physical address of the location in memory. In another embodiment, the linear address is translated by another level of page tables to determine the physical address.

Therefore, as can be seen from the example above, multiple physical memories may be "mapped" or "associated" in an address space by associating a memory's physical addresses with virtual addresses in page tables, look-aside buffers, other addressing components, etc. In certain implementations of memory management, sections of memory are isolated and/or associated with other components. For example, a section of memory space 122 is associated with a network interface card (NIC) with drivers loaded in the section of memory space 122. In an attempt for an application to write to the NIC, a write to the address space associated with the NIC, which includes the NIC's drivers, is completed. As a result, any physical memory within a computing platform mapped into an address space, which is addressable by components or devices in the system, may be associated in an entry in affinity table 155.

Affinity Table

As stated above, any number of memory devices may be mapped into address space 122. As a result, kernel-level code executing on a processor, usually does not delineate between different physical memory locations, as it often views all of memory space 122 as a single homogeneous memory space. However, as stated above, local memory 110 and 115 potentially include heterogeneous memory types or homogeneous memory types with substantially different access times.

In one embodiment, to apprise the kernel-level code of the differences between local memories, an affinity table, such as affinity table 155, is used. For each local memory, 110 and 115, a corresponding entry, such as 160 and 165, respectively, is created. For example, affinity table includes entry 160 to correspond to local memory 110, which is mapped into local memory space 130 within address space 122. Each entry, such as entry 160 and 165 in affinity table 155 is to store a logical distance for each local memory, such as local memory 110 and 115.

As used herein, a logical distance, which is also referred to as an access distance, may represent an actual physical distance, a domain, an access speed/time, or any other metric to represent an access time or distance of a local memory. As an example, domain numbers are used to represent a logical distance. Assuming local memory 110 is a DRAM with a faster access time then local memory 115, which is a NAND flash device, entry 160, which corresponds to local memory 110, stores a first domain number, such as one, to represent a logical distance of DRAM 110. However, entry 165 stores a second domain number, such as 2, to represent a logical distance of NAND 115, which is further away then DRAM 110's domain of 1. Furthermore, if another local memory, such as a cache in a processor were represented in affinity table 155, its corresponding entry would store a third domain number, such as 0, to represent a logical distance closer than both DRAM 110 and NAND 115. Note that another local NAND device with an entry in affinity table 155 is considered the same logical distance away from a processor, i.e. domain number 1.

In one embodiment, logical distances, access times, or other representations of distance or speeds of memory devices are predetermined from the type of the memory device. Upon detection of the type of memory during initialization or addition to a system, the memory device is assigned a logical distance from a predetermined list of memory type's associated logical distances. For example, a predetermined hierarchy is used to assign logical distances based on a memory type. In this example, a DRAM by default is assigned a domain level of one based on the fact that the memory is a DRAM. In contrast, a NAND device is assigned a domain level of two based on the memory device being a NAND device. Note that these categories and representations of logical distance are purely illustrative.

In an alternative embodiment, actual distances or memory access times are determined to populate entries in an affinity table. Here, a memory test or communication protocol is used to determine an access time, i.e. distance away from a processor. As an illustrative example, a test memory operation is performed to a local memory and a read/write access time is measured. Based on the measurement, either an actual measured access time or some representation based on the measured access time is stored in affinity table 255.

As stated above, each entry in affinity table 155 corresponds to a local memory in hardware system 100. However, affinity table 155 may also include entries for global/remote memory in addition to the local memory in a static resource affinity table (SRAT) implementation. More information on an SRAT table may be found at http://www.microsoft.com/whdc/system/cec/sratdwn.mspx?.

In one embodiment, associating an entry in affinity table 155, such as entry 160, with a local memory, such as local memory 110, includes storing a range of addresses of local memory 110 in memory ID field 161 of entry 160. Examples of ranges of addresses of local memory 110 include physical addresses of local memory 110, virtual addresses of local memory 110, or other addresses associated with local memory 110. For example, a range of virtual addresses associated with local memory 110 are stored in field 161 of entry 160. A range is represented by a start and end address, a base address and size value, or an other known method of representing a range of addresses. A domain number, or other representation of logical distance/access time, is stored in distance field 162, and is thereby associated with local memory 110 by the pairing of the range of addresses and the domain number in entry 160.

Although association of entries with local memories is discussed in reference to address ranges and domain numbers, any identifier for a memory paired with any representation of logical distance or access time may be used. For example, a memory identifier (ID) is paired with an actual measured or purely estimated access time in entry 160. Other examples of identifiers that may be stored in memory ID field 161 to identify local memory 110 include a name identifier, a base address and a size value, a bus number, a configuration ID, or other known or otherwise available method of identifying a memory device. These identifiers are associated with distance field, which may include a logical distance value, a physical distance value, an access time, or other known or otherwise available method of representing a distance or speed of a memory device.

Once affinity table 155 is built associating local memory devices 110 and 115 with logical distances then memory accesses are potentially directed to different local memories based on the information in affinity table 155. For example an operating system makes thread scheduling decisions and resource allocation to operations based on the logical distance of a local memory. Numerous considerations, such as the time critical nature of the operation, may be used to determine which local memory to utilize. For example, if local memory 110 is a DRAM associated with a faster access distance in affinity table 155 than NAND device 115, then an operation that is extremely time-critical is scheduled to utilize DRAM 110, as it represented by the faster access distance. In the alternative, an thread that is to run in the background, which is not time intensive, is scheduled to use local memory 115, to ensure local memory 110 is available for other operations. Other considerations such as the size of local memory, the type of thread or operation to be executed/performed, or any other known consideration for choosing a memory based on access distance/speed may be used in determining which local memory to utilize.

An Embodiment of a System

Figure 2:
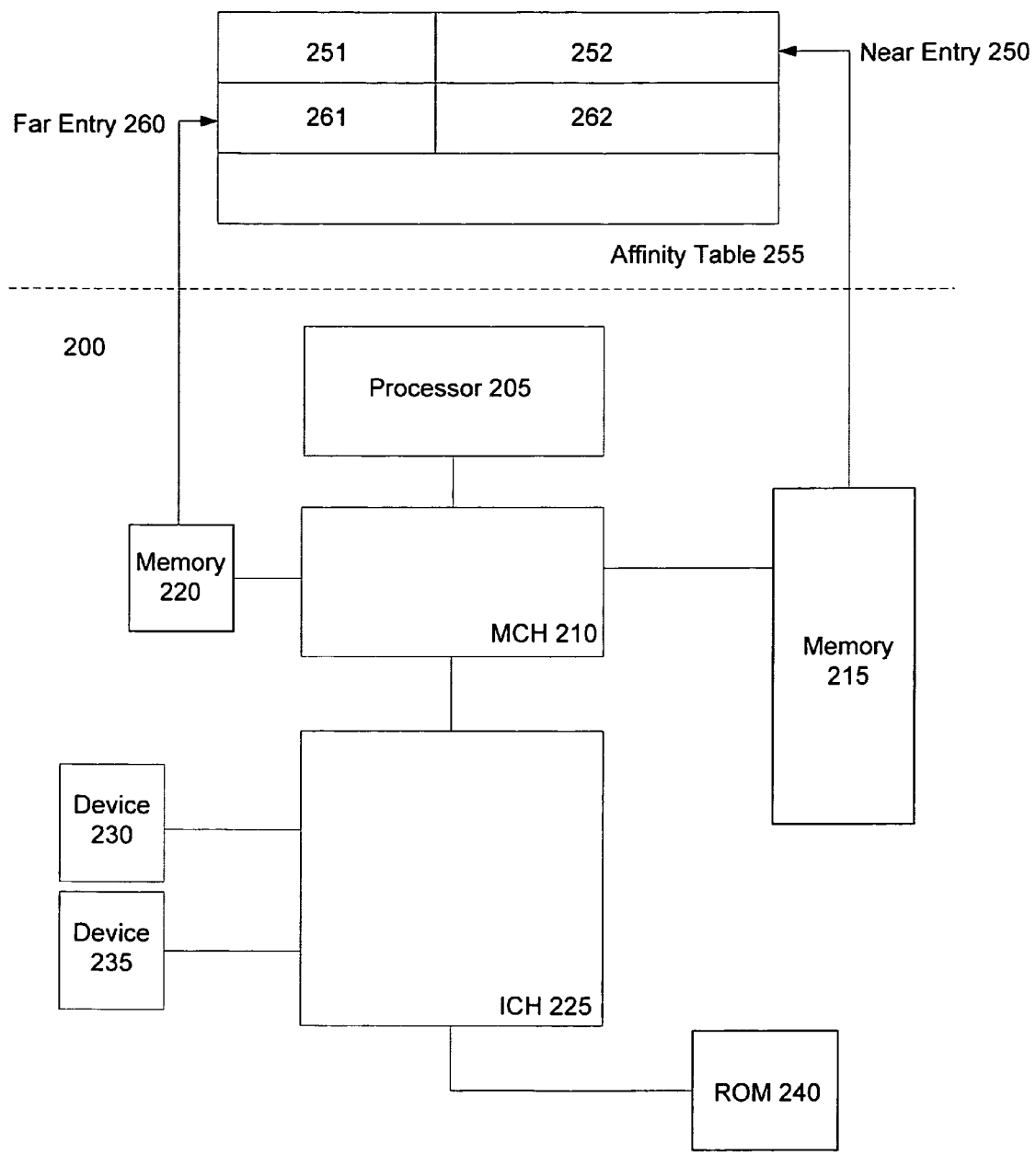
FIG. 2 illustrates an embodiment of a layered view of local memory in a system associated with a representation of a distance in an entry within an affinity table.
Figure 3:
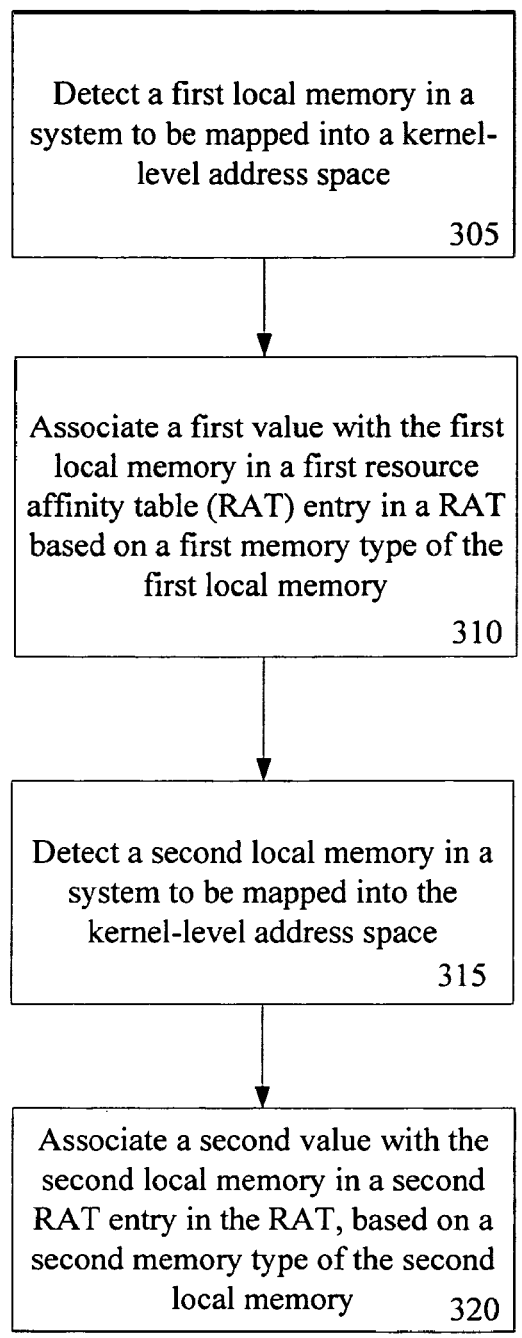
FIG. 3 illustrates an embodiment of a flow diagram for a method of supporting heterogeneous memory.

Referring next to FIG. 3, an embodiment of a system to utilize an affinity table for local memories is illustrated. Computing platform 200 illustrates processor 205 coupled to local memories 215 and 220 through memory controller hub (MCH) 210. MCH 210 is coupled to interconnect controller hub (ICH) 225, which is coupled to a read-only memory (ROM) 240 to store basic input/output software (BIOS) and devices 230 and 235. Also illustrated, is a layered view of affinity table 255, which is stored in and accessed by system 200. System 200 includes any electronic system for accessing a plurality of local memories, such as a computing platform, a desktop, a notebook, a PDA, a cell-phone, etc. Furthermore, system 200 may include multiple processors, as well as a drastically different configuration than the configuration shown in FIG. 2.

Examples of local memories 215 and 220 include any random access memory (RAM), static RAM (SRAM), dynamic RAM (DRAM), double-data rate (DDR) RAM, synchronous DRAM (SDRAM), non-synchronous DRAM, extended data out DRAM (EDO RAM), buffered-RAM, read only memory (ROM), non-volatile memory, flash memory, NOR flash memory, NAND flash memory, or other known or otherwise available memory device.

In one embodiment, affinity table 255 is initially built by BIOS and stored in ROM 240. As an example, affinity table 255 is a static table, which after being created, is stored in a compressed format in ROM 240. Affinity table 255 is then loaded into a local memory, such as memory 215, in an uncompressed format for kernel-level code to access to make operation and thread scheduling determinations based on affinity table 255.

In another embodiment, affinity table 255 may be a dynamic table stored in any memory in system 200. As an illustrative example, after loading affinity table 255 in memory 215, another entry is created for a hot plug added local memory device, which is added to the system during runtime. Here, an interrupt is generated upon insertion of the local memory device, a handler informs an operating system of the added device, and either directly or through a call to a separate handler creates another entry in affinity table 255. However, any known or otherwise available method of detecting and enabling a hot plug device may be used to both add a local memory to the view of an operating system and add a corresponding entry to a resource affinity table (RAT), such as affinity table 255.

As an illustration of creation and operation of affinity table 255 in system 200 the following example is discussed. Assume memory 220 is a NAND flash device and memory 215 is a DRAM. Upon boot/initialization of system 200, DRAM 215 is detected and a corresponding near entry 250 is created in affinity table 255, which is stored in ROM 240. In memory ID field 251, a representation of memory 215 is stored, which includes a memory identifier, such as a range of addresses associated with DRAM 215. A logical/access distance is stored in distance field 252. Where a logical distance is represented by domain numbers, a domain number is stored in distance field 252. As stated above, in one embodiment, the domain number is determined from memory 215 being a DRAM device. Either from a list or memory hierarchy, a domain number associated with a DRAM device, such as the domain of one, is stored in distance field 252.

Furthermore, when memory 220 is detected, far entry 260 is created in affinity table 255. Based on memory 220 being a NAND device a domain number, such as two, representing that memory 220 is farther than memory 215 is stored in distance field 262. Note that, as illustrated, memory 220 and memory 215 are physically located a similar distance from processor 205. However, a logical distance is not so limited, as it may represent that NAND 220 has slower access times than DRAM 215. Assuming ROM 240 is not mapped into an address space addressable by the system, there is no need to create an entry corresponding 240. However, ROM 240 may also have a corresponding entry in affinity table 255. Creation of an affinity table is discussed in more detail in reference to FIGS. 3-4.

Upon completion of creating entries for local memory in system 200, affinity table 255 is compressed in ROM 240. During runtime, affinity table 255 is uncompressed and loaded into a local memory, such as DRAM 215. Processor 205 during execution of kernel-level code schedules software threads, operations, and memory accesses based on affinity table 255. For example, a software thread that does not require as much memory space and is not time-critical, is assigned to NAND 220, while a time-critical operation that would stall processor 205's execution is assigned to DRAM 215.

An Embodiment of a Flow Diagram for Creating a Local Resource Affinity Table (LRAT)

Turning next to FIG. 3, an embodiment of a flow diagram for creating a local resource affinity table (LRAT) is illustrated. In flow 305, a first local memory in a system to be mapped into a kernel-level address space is detected. In one embodiment, upon boot and initialization of memory, the first local memory is detected. Known and otherwise available methods are used to detect memory upon initialization. Alternatively, during runtime, if a memory is hot-plugged into a system, an interrupt and handler method may be used to detect the memory. Other known methods of hot-plug addition to a system may also be used to detect insertion of a memory device.

In flow 310, a first value is associated with the first local memory in a first local resource affinity table (LRAT) entry in a LRAT based on a first memory type of the first local memory. In one embodiment, the first value represents a logical distance or access speed. Examples of the first value include a domain number, a memory access speed value, distance value, or otherwise known number for representing access times, distances, or latency of memory devices.

Basing the first value on the memory type includes storing the first value in the LRAT entry depending on the memory type of the first local memory. As stated above, as one example, the first value is based on a predetermined hierarchy of memory types. An exemplary hierarchy from fast to slow memory types includes SRAM, DRAM, and flash. As a result, if the first local memory is a DRAM, then a domain number of 2 is associated with the DRAM. Alternatively, an arbitrary starting number is selected for the first memory based on the memory type and then subsequent memories are assigned higher domain numbers if they are considered slower memory types in the hierarchy or lower domain number if they are considered faster memory types in the hierarchy. Other methods of representing distance and access time, as well as methods of basing the first value on memory type may be sued.

Associating the first value with the first local memory, in one embodiment, includes identifying the first local memory in the first LRAT entry and storing the first value in the first LRAT entry. The pairing of the first local memory identifier and the first value in the first LRAT entry associates the first memory with the first LRAT entry and the first value stored in the first LRAT entry. A memory ID, bus ID, range of addresses associated with the first memory, or other known memory identifier is stored in the first LRAT entry to identify the first memory. For example, a base address of the first memory and a size value of the first memory is stored in the first LRAT entry to identify the first memory. Continuing the example from above, where the first memory is a DRAM, a range of addresses, physical or virtual, associated with the DRAM are stored in the first LRAT entry along with the first value, i.e. 2, which is determined by the memory type of the first memory being DRAM.

Next, in flow 315 a second local memory in a system to be mapped into the kernel-level address space is detected. As above, the second local memory is detected upon boot/initialization or during runtime through similar known methods. Then in flow 320, a second value is associated with the second local memory in a second LRAT entry in the LRAT, based on a second memory type of the second local memory. The second LRAT entry may be created in the LRAT in any of the manners discussed above. As a result, the LRAT contains two entries, one corresponding to the first local memory and one corresponding to the second local memory.

Note that the LRAT may include additional fields, such as an access time field and a logical distance field or other information. In addition, the number of local memories in a system and the number of LRAT entries in an LRAT is not limited to two. As an example, four local memories to be mapped into an address space have four corresponding entries in an LRAT.

Figure 4:
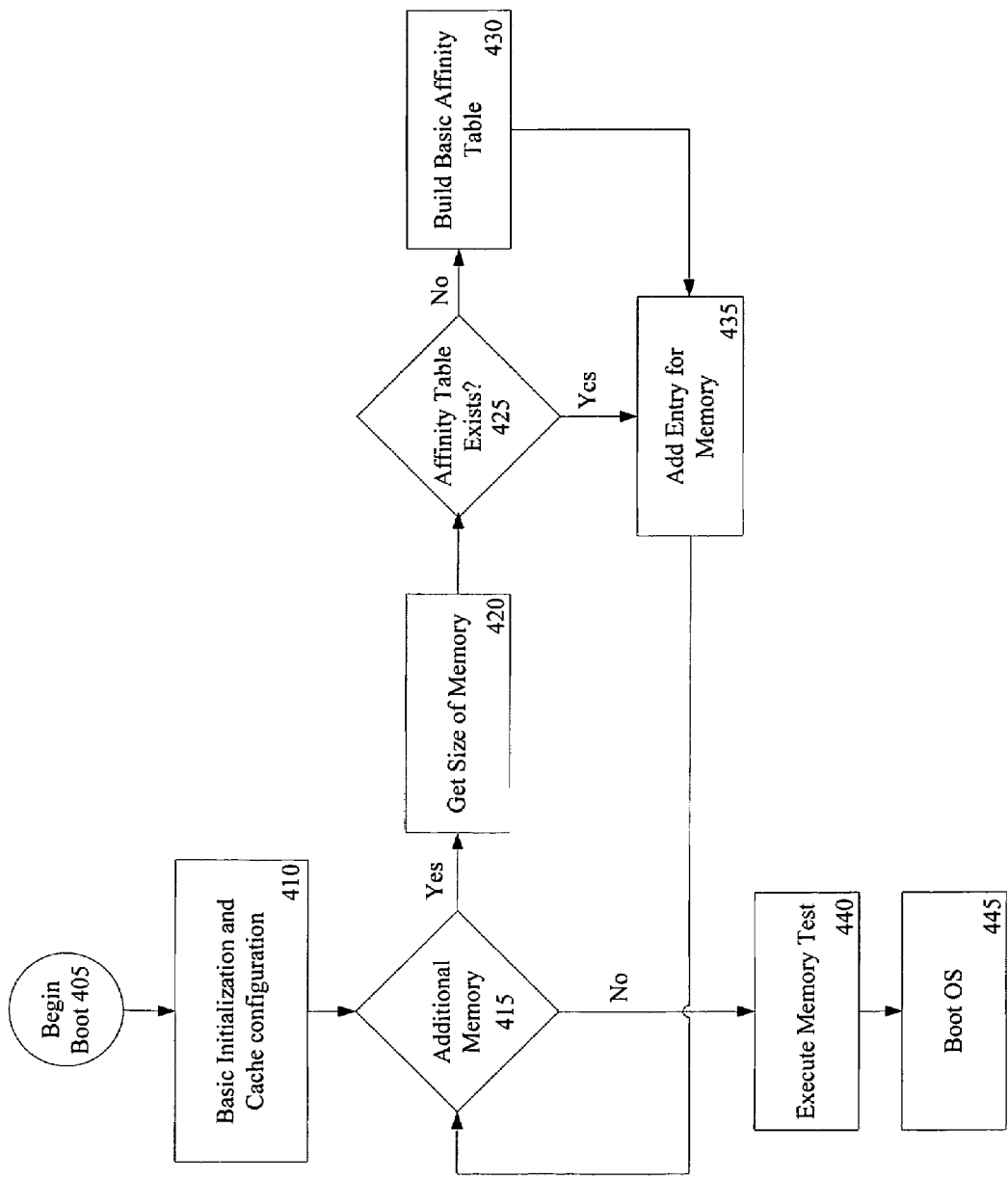
FIG. 4 illustrates an embodiment of a flow diagram for creating entries in an affinity table to correspond to local memory to support heterogeneous memory.

Turning next to FIG. 4, another illustrative embodiment of creating an LRAT upon initialization of a system is illustrated. In flows 405 and 410, well-known initialization and boot steps occur. They are not discussed herein to avoid obscuring the discussion. In decision flow 415, it is determined if there is any additional memory to be initialized and/or recorded in a resource affinity table (RAT). To illustrate the flow, assume that the first local memory is detected in decision flow 415.

Next, in flow 420, the size of the memory is obtained. The size of memory may be obtained through any known protocol or otherwise available method of getting the size of a memory device. In flow 415, it is determined if a RAT currently exists. If a RAT does not exist, then the RAT is built in flow 430. In one embodiment, building the RAT includes allocating the space in BIOS memory for the table and defining the structure for the table. In another embodiment, building the RAT simply includes storing the first entry in a memory and linking subsequent entries to the first entry to form a table structure. Yet, any known or otherwise available method of building a table structure in memory may be used.

In contrast, in flow 425 if a RAT had been built then in flow 435 another entry in the RAT for the current memory is created. Note that the LRAT for local memory and the SRAT for remote memory may fully or partially overlap, as well as be completely separate tables. After the entry is created, flow is returned to flow 415. If there is additional memory, flow 420-435 is repeated, and if there is no additional memory, then usual memory test and boot to the OS occur in flow 440 and 445.

An Embodiment of an Article of Manufacture

The embodiments of methods, software, firmware or code set forth above may be implemented via instructions or code stored on a machine-accessible or machine readable medium which are executable by a processing element. A machine-accessible/readable storage medium includes any mechanism that provides (i.e., stores and/or transmits) information in a form readable by a machine, such as a computer or electronic system. For example, a machine-accessible storage medium includes random-access memory (RAM), such as static RAM (SRAM) or dynamic RAM (DRAM); ROM; magnetic or optical storage medium; or flash memory devices. A machine accessible transmission medium includes electrical, optical, acoustical or other form of propagated signals (e.g., carrier waves, infrared signals, digital signals); etc.

As illustrated above, heterogeneous local memory types or homogeneous local memory types with different access times are supported in a system. Previously, if heterogeneous memory types were mapped into an address space, there would be no delineation between the memories. A slower local memory potentially receives time-critical operations, while the faster memory type sits idle. In contrast, through use of an LRAT, operating system code or even hardware potentially schedules threads and/or memory operations according to any number of considerations, which results in a more efficient use of available memory. This usage model allows for inexpensive and efficient local memory design by allowing for a balance the cost, access times, power consumption, and availability of heterogeneous memory devices.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a memory device to hold
   a first value to represent a first access distance associated with a first local memory, which is to be mapped into an address space, based on a first memory type of the first local memory; and
   a second value to represent a second access distance associated with a second local memory, which is to be mapped into the address space, based on a second memory type of the second local memory,
   wherein a time-critical memory access is to be directed to the first local memory in response to the first and second values indicating the first local memory has a smaller access distance than the second local memory, and wherein a non-time critical memory access is to be directed to the second local memory in response to the first and second values indicating the second local memory has a larger access distance than the first local memory.

2. The apparatus of claim 1, wherein the first and second values are to be associated with the first local memory and the second local memory, respectively, in a Static Resource Affinity Table (SRAT).

3. The apparatus of claim 1, wherein the first value is to represent that the first access distance associated with the first local memory is a smaller access distance than the second access distance associated with the second local memory in response to the first memory type being determined to be a faster memory type than the second memory type.

4. The apparatus of claim 3, wherein the first memory type is a Dynamic Random Access Memory (DRAM) and the second memory type is a slower Non-Volatile Memory (NVM), and wherein the first value is to represent the first access distance associated with the DRAM is a smaller access distance than the second access distance associated with the NVM.

5. The apparatus of claim 3, wherein determining if a first memory type is a faster memory type than the second memory type includes checking a predetermined hierarchy of memory types to determine if the first memory type is faster than the second memory type.

6. The apparatus of claim 3, wherein the second value is to represent that the second access distance associated with the second local memory is a longer access distance than the first access distance associated with the first local memory in response to the second memory type being determined to be a slower memory type than the first memory type.

7. A system comprising:
   a first type of memory coupled to a controller hub to be mapped into a first range of an addressable memory space;
   a second type of memory coupled to the controller hub to be mapped into a second range of the addressable memory space;
   a memory device to hold a table to represent a first distance of the first range of the addressable memory space and a second distance of the second range of the addressable memory space based on a first access speed of the first type of memory and on a second access speed of the second type of memory, respectively; and
   a processor coupled to the controller hub to execute operating system (OS) code, wherein the OS code, when executed by the processor, is to associate a thread, which is not time-critical, with the second range of the addressable memory space in response to the second distance being farther than the first distance based on the second access speed of the second type of memory being slower than the first access speed of the first type of memory.

8. The system of claim 7, wherein the table is a resource affinity table to be loaded in the first type of memory.

9. The system of claim 7, wherein the first and second types of memory are individually selected from a group consisting of a Static Random-Access (SRAM), a Dynamic Random-Access Memory (DRAM), a Synchronous DRAM (SDRAM), a Double-Rate DRAM (DDR), a Fully-Buffered DRAM (FBD), a Non-volatile memory (NVM), a Read Only Memory (ROM), a NAND Flash, a NOR flash, and a polymer memory.

10. The system of claim 7, wherein the first type of memory is a Static Random-Access (SRAM) in the processor, the second type of memory is a Dynamic Random-Access Memory (DRAM), and the table is to represent the second distance of the second range of addressable memory space is farther than the first distance of the first range of addressable memory space.

11. The system of claim 7, wherein the first type of memory is a Dynamic Random-Access Memory (DRAM), the second type of memory is a Non-Volatile Memory (NVM), and the table is to represent the second distance of the second range of addressable memory space is farther than the first distance of the first range of addressable memory space.

12. The system of claim 11, wherein the table is stored in a compressed format in the NVM, and loaded into the DRAM to be accessed by the OS code.

13. The system of claim 7, wherein the processor is a microprocessor capable of out-of-order speculative execution.

14. A method comprising:
   detecting a first local memory in a system to be mapped into a kernel-level address space, wherein the first local memory is a first memory type;
   associating a first value with the first local memory in a first resource affinity table (RAT) entry in a RAT based on the first memory type;
   detecting a second local memory in a system to be mapped into the kernel-level address space, wherein the second local memory is a second memory type;
   associating a second value with the second local memory in a second RAT entry in the RAT, based on the second memory type.

15. The method of claim 14, further comprising:
   determining if the RAT exists before associating the first value with the first local memory.

16. The method of claim 14, wherein the first and second memory type is individually selected from a group consisting of a Static Random-Access (SRAM), a Dynamic Random-Access Memory (DRAM), a Synchronous DRAM (SDRAM), a Double-Rate DRAM (DDR), a Fully-Buffered DRAM (FBD), a Non-volatile memory (NVM), a Read Only Memory (ROM), a NAND Flash, a NOR flash, and a polymer memory.

17. The method of claim 14, wherein the first value represents a first logical distance based on the first memory type, and wherein the second value represents a second logical distance based on the second memory type.

18. The method of claim 17, wherein the first logical distance is less than the second logical distance, if the first memory type is determined to be a faster memory type than the second memory type.

19. The method of claim 17, wherein the first logical distance is greater than the second logical distance, if the first memory type is determined to be a slower memory type than the second memory type.

20. The method of claim 17, wherein the first logical distance is equal to the second logical distance, if the first memory type is determined to be the same memory type as the second memory type.

21. The method of claim 14, wherein associating the first value with the first local memory in the first RAT entry in the RAT based on the first memory type comprises:
   storing a first range of the kernel-level address space, which the first local memory is to be mapped into, in the first RAT entry; and
   storing the first value in the first RAT entry based on the first memory type to associate the first value with the first local memory in the first RAT entry.

22. The method of claim 14, wherein associating the second value with the second local memory in the second RAT entry in the RAT based on the second memory type comprises:
   storing a second range of the kernel-level address space, which the second local memory is to be mapped into, in the second RAT entry; and
   storing the second value in the second RAT entry based on the second memory type to associate the second value with the second local memory in the second RAT entry.

23. The method of claim 14, wherein detecting a first local memory in a system to be mapped into a kernel-level address space comprises:
   determining if the first local memory is present upon initialization of the system.

24. The method of claim 14, wherein detecting a second local memory in a system to be mapped into a kernel-level address space comprises:
   determining if the second local memory is present upon initialization of the system.

25. The method of claim 14, wherein detecting a second local memory in a system to be mapped into a kernel-level address space comprises:
   receiving a notification during runtime that the second local memory has been hot-plugged into the system.

26. A machine accessible storage medium including program code which, when executed by a machine, causes the machine to perform the operations of:
   determining a first logical distance value of a first local memory in the machine;
   associating the first logical distance value with the first local memory in a first table entry of a table;
   determining a second logical distance value of a second local memory in the machine, wherein the first and the second logical distance values indicate the first local memory is closer than the first local memory; and
   associating the second logical distance value with the second local memory in a second table entry of the table;
   wherein the machine, when executing additional program code, is to associate a time critical thread with the first local memory based on the first and the second logical distance values indicating the first local memory is closer than the first local memory.

27. The machine accessible storage medium of claim 26, wherein determining a first logical distance value and determining a second logical distance value each include a logical distance determination operation selected from a group consisting of determining a physical distance, determining an access time, and determining an access speed.

28. The machine accessible storage medium of claim 26, wherein determining a first logical distance value and determining a second logical distance value comprises:
   determining the first logical distance value from a predetermined hierarchy of memory types based on a first memory type of the first local memory;
   determining the second logical distance value from the predetermined hierarchy of memory types based on a second memory type of the second local memory.

29. The machine accessible storage medium of claim 26, wherein the table includes a static resource affinity table (SRAT), wherein the SRAT also includes logical distances associated with remote memory.

30. The machine accessible storage medium of claim 26, wherein the additional program code includes kernel level program code, and wherein the machine, when executing the kernel-level code, is to associate a non-time critical thread with the second local memory based on the first and the second logical distance values indicating the second local memory is farther than the first local memory.

* * * * *